United States Patent [19]

Yanagawa

[11] 4,364,656
[45] Dec. 21, 1982

[54] ELECTROPHOTOGRAPHIC COPYING MACHINE

[75] Inventor: Nobuyuki Yanagawa, Chigasaki, Japan

[73] Assignee: Ricoh Company, Ltd., Tokyo, Japan

[21] Appl. No.: 186,276

[22] Filed: Sep. 11, 1980

[30] Foreign Application Priority Data

Sep. 14, 1979 [JP] Japan .............................. 54-118091

[51] Int. Cl.$^3$ ............................................ G03G 15/00
[52] U.S. Cl. ................ 355/3 CH; 355/3 R; 355/3 BE; 355/14 CH; 313/238
[58] Field of Search ................ 355/3 R, 3 BE, 3 CH, 355/14 CH; 313/237, 238; 324/326

[56] References Cited

U.S. PATENT DOCUMENTS

| | | | |
|---|---|---|---|
| 3,578,970 | 5/1971 | Michaud et al. | 355/3 CH X |
| 3,609,354 | 9/1971 | Herman | 355/3 CH X |
| 3,792,924 | 2/1974 | Matsuda et al. | 355/3 BE |
| 4,050,802 | 9/1977 | Tanaka et al. | 355/3 R |
| 4,062,631 | 12/1977 | Ichikana et al. | 355/3 R |
| 4,129,376 | 12/1978 | Yotsukura | 355/3 R X |
| 4,170,175 | 10/1979 | Conlon Jr. | 355/3 BE X |
| 4,178,092 | 12/1979 | Yamamoto et al. | 355/3 CH X |
| 4,206,994 | 6/1980 | Silverberg et al. | 355/3 BE |

Primary Examiner—A. C. Prescott

Attorney, Agent, or Firm—Guy W. Shoup; Gerard F. Dunne

[57] ABSTRACT

An electrophotographic copying machine includes a photosensitive member in the form of an endless belt which repeats a stop and an angular motion. A carriage reciprocates above a flat run of the photosensitive member in parallel relationship therewith when the latter is at rest. A charger, an illumination unit, an optical system and a high tension generator are mounted on the carriage. The charger is utilized to charge the photosensitive member to a given polarity. The illumination unit illuminates an original which is fixedly placed on an original receptacle. The optical system projects an image of the original illuminated onto the photosensitive member. The high tension generator supplies a current to the charger and the illumination unit. During a movement of the carriage in the forward direction, the charger charges the photosensitive member to a given polarity, on which the image of the original illuminated is projected by the optical system, thus forming an electrostatic latent image on the photosensitive member. The latent image is converted into a visual image as the photosensitive member passes through a developing unit during its angular movement. The visual image is transferred onto a transfer sheet which is brought into contact with the photosensitive member. After the transfer step, the surface of the photosensitive member is cleaned.

20 Claims, 33 Drawing Figures

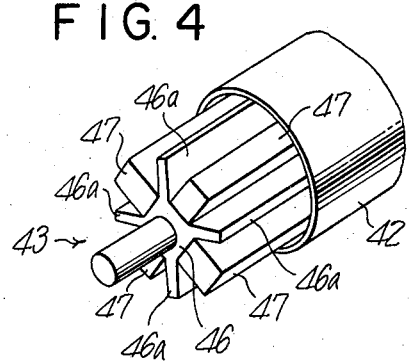
FIG. 4
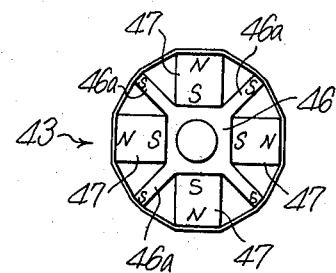
FIG. 5
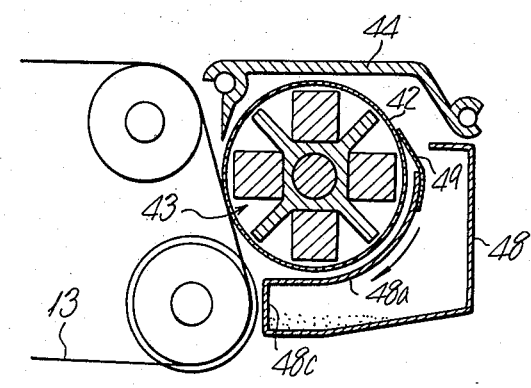
FIG. 6
FIG. 7
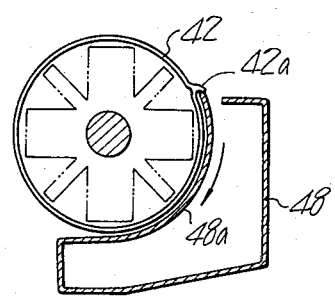
FIG. 8
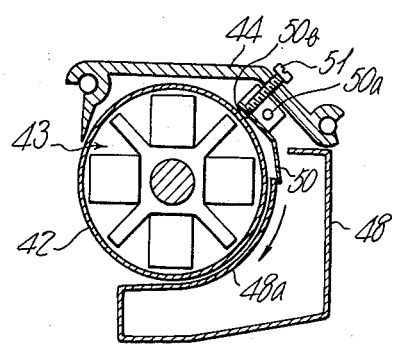

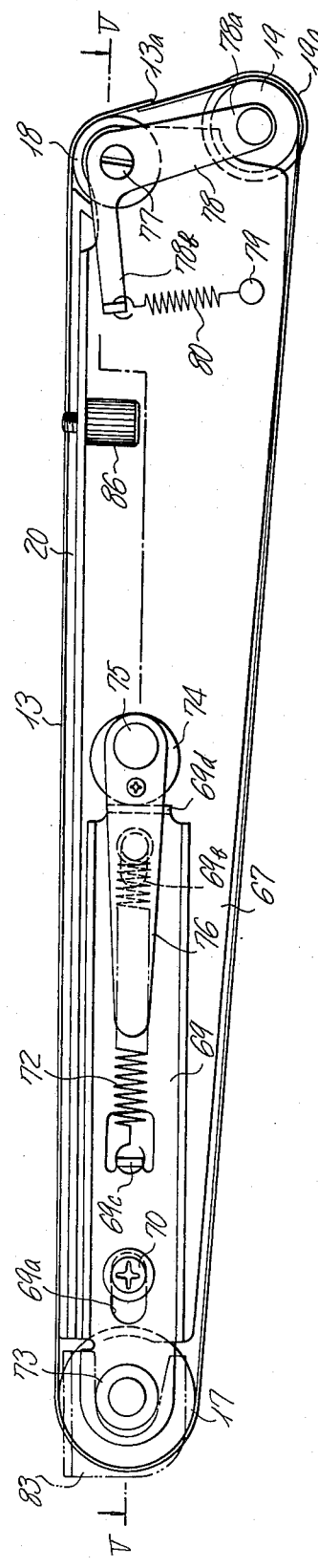
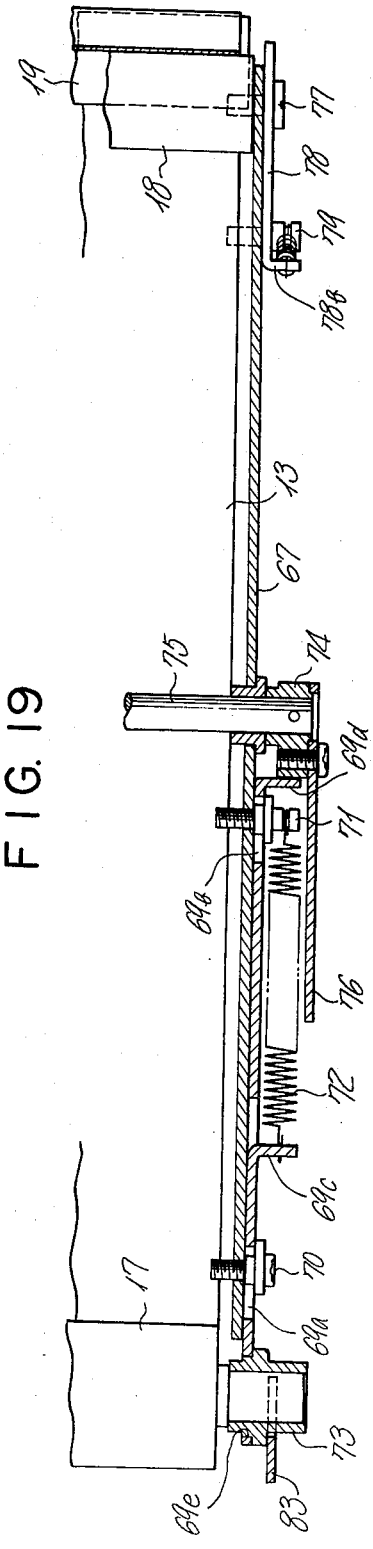
FIG. 18
FIG. 19

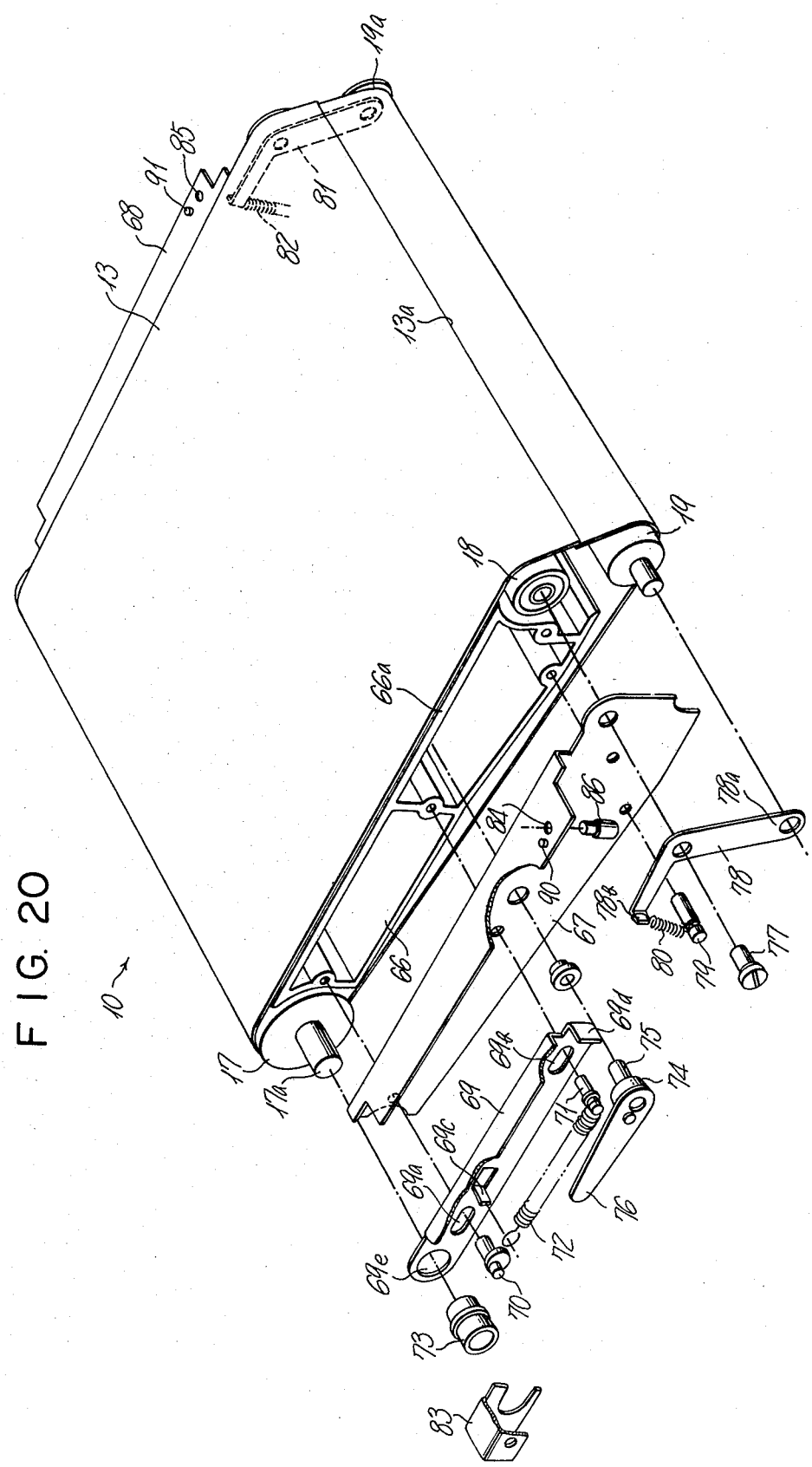

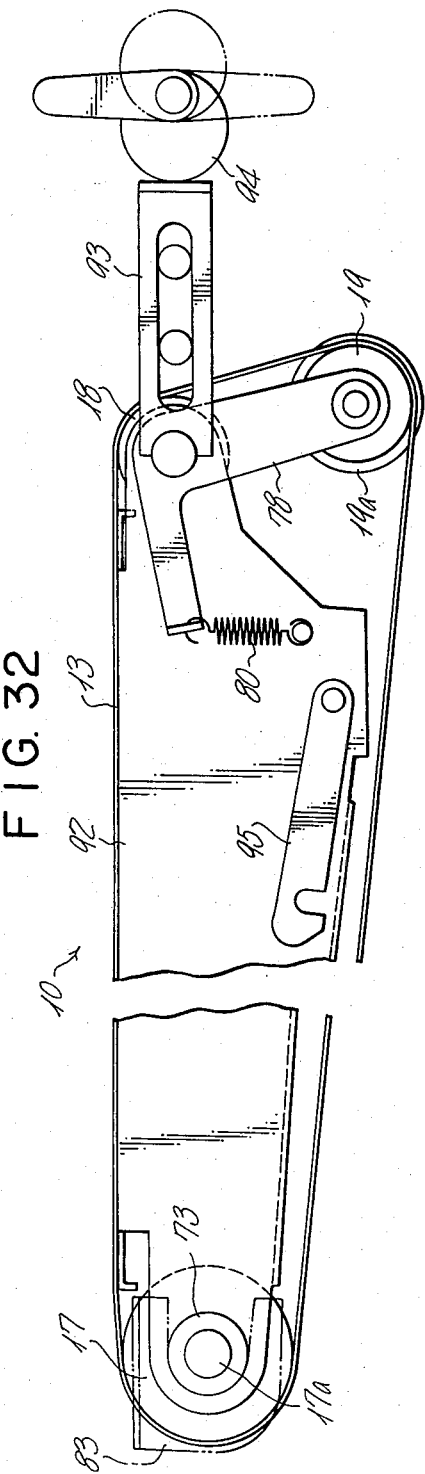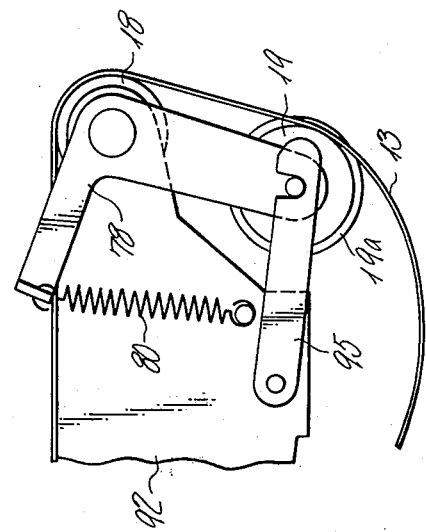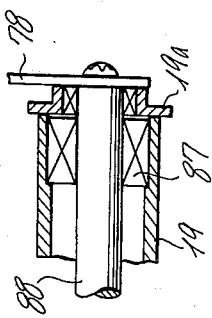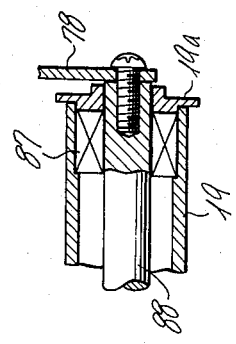

ELECTROPHOTOGRAPHIC COPYING MACHINE

BACKGROUND OF THE INVENTION

The invention relates to an electrophotographic copying machine.

Electrophotographic copying machines have been proposed which employ a movable exposure system which moves to scan a photosensitive member which remains at rest, for the purpose of forming an electrostatic latent image on the photosensitive member. In such an exposure system, the exposure process takes place in a stabilized manner to provide a good image quality because the photosensitive member remains stationary during exposure. Such an exposure system typically includes a carrier movable between two positions and carrying a charger for charging the photosensitive member, an illumination unit for illuminating an original and a light transmitting device for focusing a light image of the original on charged portions of the photosensitive member. By contrast, with a more usual exposure system, the charger is fixedly mounted within the casing of a copying machine while the photosensitive member is adapted to move therepast. However, if a high tension generator which supplies a high tension of voltage to the movable charger is fixedly mounted within the casing in a usual manner as with the conventional exposure system, there must be provided means, such as a collector brush and a collector rail, or a flexible high tension cable of an increased length, in order to supply the high tension to the moving charger from the high tension generator. It will be appreciated that the provision of such a high tension collector or a high tension cable of an increased length increases the chance for a leakage of power or electric shock to occur, and also causes a radio interference.

SUMMARY OF THE INVENTION

In view of the foregoing, it is an object of the invention to provide an electrophotographic copying machine which dispenses with high tension collector means such as a collector brush or collector rail or a flexible high tension cable of an increased length.

The above object of the invention is achieved by providing an electrophotographic copying machine in which a high tension generator which supplies a high tension to a charger is mounted on a carriage disposed for reciprocating motion above and in parallel relationship with a flat run of a photosensitive member, with the charger, an illumination unit and a light transmitting also mounted on the carriage.

In accordance with the invention, there is provided an electrophotographic copying machine which minimizes the distance between the charger and the high tension generator across which a high tension is supplied to thereby minimize the chance for leakage or electric shock to occur, simultaneously reducing the occurrence of radio interferences.

In accordance with another aspect of the invention, the high tension generator is disposed upstream of the illumination unit, as viewed in a direction of flow of a cooling air stream, whereby it is made less sensitive to the influence of relatively high temperatures produced by the illumination unit.

According to a further aspect of the invention, the carriage is provided with a shield screen, which functions as a guide member to support a flexible cable in the form of a flat ribbon in a flexible manner. The cable includes input lead wires to the high tension generator.

BRIEF DESCRIPTION OF THE DRAWINGS

FIG. 4 is a perspective view of a cleaning unit used in the copying machine of FIG. 1, illustrating the layout of the magnet elements therein.

FIG. 5 is a front view showing another arrangement of the magnet elements.

FIGS. 6 to 8 are longitudinal sections of different forms of the developer recovery means used in the cleaning unit of FIG. 4.

FIG. 18 is a front view of the belt-shaped photosensitive member and its associated support means.

FIG. 19 is a section taken along the line V-V shown in FIG. 18.

FIG. 20 is an exploded perspective view of the arrangement shown in FIG. 18.

FIGS. 27 and 28 are cross sections illustrating different manners of mounting a flange.

FIG. 32 is a front view of still another embodiment of the invention.

FIG. 33 illustrates the operation of the arrangement shown in FIG. 32.

DESCRIPTION OF EMBODIMENTS

Figure 1:
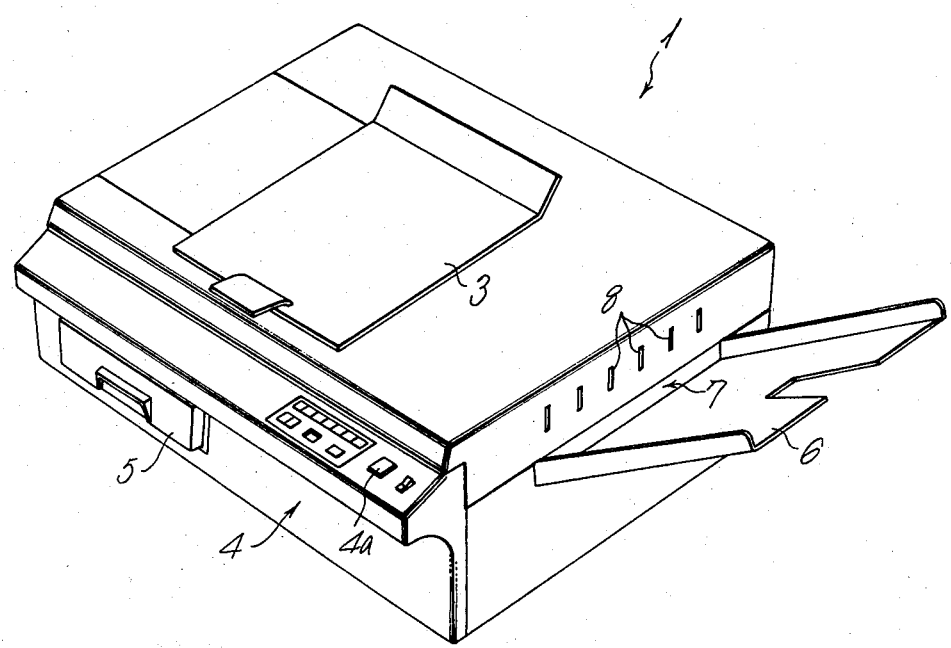
FIG. 1 is a perspective view showing the appearance of one form of an electrophotographic copying machine to which the invention is applied.
Figure 2:
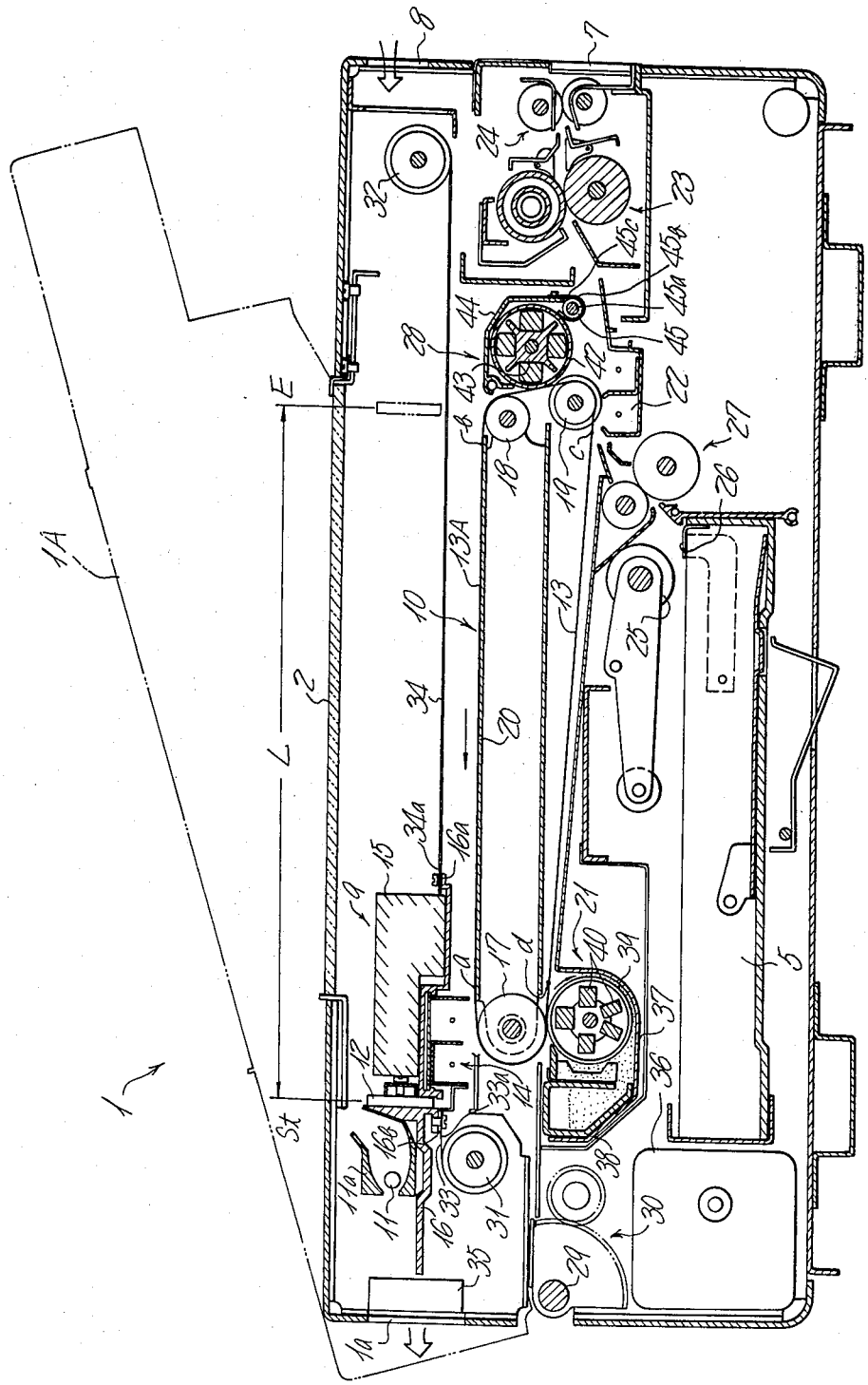
FIG. 2 is a longitudinal section of the copying machine shown in FIG. 1.

Referring to FIG. 1, the appearance of an electrophotographic copying machine 1 according to one embodiment of the invention is shown. A longitudinal section of the machine is shown in FIG. 2. On its top surface, the machine 1 is provided with a contact glass 2 (only shown in FIG. 2) on which an original is placed, and a retainer 3 (only shown in FIG. 1) which retains the original in place. The copying machine 1 includes a top portion 1A which can be turned upwardly as indicated by phantom line in FIG. 2. Numeral 4 represents an operating unit, numeral 5 a sheet cassette in the form of a drawer, numeral 6 a copy tray onto which a copy is delivered through a delivery port 7, and numeral 8 a plurality of openings for admitting cooling air.

Referring to FIG. 2, a charger/exposure unit 9 is disposed below the contact glass 2, and a belt assembly 10 formed of OPC photosensitive material or the like is disposed below the exposure unit 9. The charger/exposure unit 9 comprises an illumination lamp 11 which slitwise illuminates an original placed on the contact glass 2, an imaging optical system 12 formed by an array of focusing light transmitting members which transmit the image of the original illuminated onto the belt 13 of the photosensitive material, a charger 14 for charging the belt 13 to a given polarity prior to the exposure step, a high tension or voltage generator 15 for supplying a high tension to the charger, and a support 16 which supports the described units and devices substantially in an integral manner. The charger/exposure unit 9 is movable along a guide rail to be described later such that the imaging system 12 reciprocates, moving from its start position ST to its end position E through a distance L during its forward stroke and, return to the start position ST.

The belt assembly 10 comprises a drive roller 17, a driven roller 18, a tension roller 19, the belt 13 which extends around these rollers, and a guide plate 20 which is used to maintain the upper run of the belt in a flat plane. During the forward stroke of the charger/exposure unit 9, the belt 13 remains at rest, whereby the latter is charged by the charger 14. Subsequently, it is scanned by the illumination lamp 11 and the focusing system 12 to have an electrostatic latent image formed thereon which corresponds to the image of the original. When the charger/exposure unit 9 reaches its end position E, the belt 13 begins to move in a direction indicated by an arrow so that the latent image can be converted into a visual image by a developing unit 21 to be described later.

Figure 17:
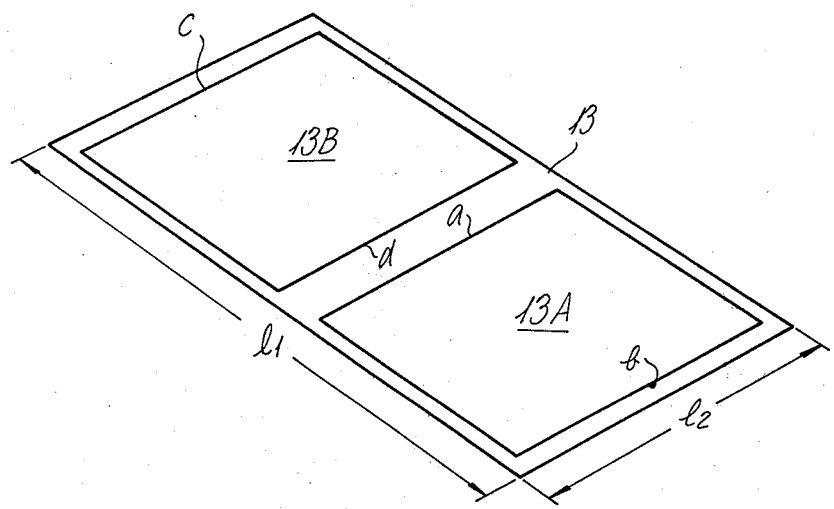
FIG. 17 is a view of a photosensitive member in the form of a belt.

The photosensitive member or the belt 13 includes a pair of image forming regions 13A, 13B, one extending from point a to point b and the other extending from point c to point d (see FIGS. 2 and 17). After the exposure is completed, the belt 13 continues to move, and is momentarily stopped when the point a thereon reaches the location of the point c and the point b reaches the location of the point d. Specifically, the span of the belt 13 between the points a, b is equal to the span between the points c, d, and the overall length l of the belt is chosen so that an equal distance is provided between both of the image forming regions or between the points a, d and between the points b, c. Consequently, during one cycle of an exposure operation, the belt 13 moves through a distance of l/2. As the belt 13 moves through the distance l/2, an electrostatic latent image formed on the first image forming region 13A is converted into a visual image by a developing unit 21 of dry type. The first visual image is then maintained in the underpath or the lower run of the belt.

When the belt 13 is stopped after travelling through the distance l/2, the charger/exposure unit 9 initiates its second reciprocating motion, whereby another electrostatic latent image is formed on the second image forming region 13B. When the unit 9 reaches its end position E, the belt 13 begins to move again, travelling through the distance l/2. During such interval, a second visual image is formed on the belt by the developing unit 21.

When the belt 13 moves for the second time, a copy sheet which is delivered from the sheet cassette 5 is brought into contact with the first visual image which has been maintained on the belt and which is now transferred onto the copy sheet by means of a transfer charger 22. Subsequently, the second visual image is maintained on the underpath of the belt. The copy sheet having the first visual image transferred thereto has its image fixed by a fixing unit 23, and is then delivered onto the copy tray 6 through a pair of delivery rollers 24.

It will be understood that a stack of copy sheets (not shown) is contained in the sheet cassette 5, and an uppermost one of the copy sheets is fed by a feed roller 25 and a separating claw 26, and passed between a pair of register rollers 27 to be brought into contact with the belt 13 in synchronism with a movement of the visual image which has maintained on the underpath of the belt (or the movement of the belt) to have the visual image transferred thereto.

After the transfer of the visual image, the surface of the belt 13 is cleaned by a cleaning unit 28 which is located downstream of the transfer charger, as viewed in the direction of movement thereof, in preparation to the next charging and exposure step.

The described process of maintaining the belt 13 at rest while causing a reciprocating motion of the charger/exposure unit 9 to form an electrostatic latent image thereon, then moving the belt through a travel l/2 to convert the latent image into a visual image which is then temporarily maintained at rest, and subsequently transferring the visual image onto a copy sheet at the next time the belt is driven for movement may be repeated to provide a number of copies from a single original.

As mentioned previously, the copying machine shown in FIG. 2 is constructed so that its top portion 1A can be opened and closed. The top portion 1A is pivotally mounted on a pin 29, and can be stopped at any desired angle by a frictional brake mechanism 30 including a sector-shaped gear and its meshing gear.

As mentioned previously, the charger/exposure unit 9, the belt assembly 10 and the cleaning unit 28 are mounted on the top portion 1A of the copying machine. Secured to the longitudinal ends of the charger/exposure unit 9 are respective ends of light shield screens 33, 34 which are disposed on takeup drums 31, 32 to be described later, thereby preventing the photosensitive surface of the belt 13 from being inadvertently exposed to the light passing through the contact glass 2.

It will be noted that a cooling fan 35 is disposed on the top portion 1A of the copying machine along its one end to prevent an overheating of the illumination lamp 11.

Disposed in the bottom portion of the copying machine is a sheet feeder mechanism including the sheet cassette 5, feed roller 25 and register roller pair 27, the developing unit 21, the fixing unit 23 and a drive motor 36 which represents the drive source of the copying machine. These mechanisms are connected with the drive motor 36 through a transmission mechanism, not shown.

Figure 3:
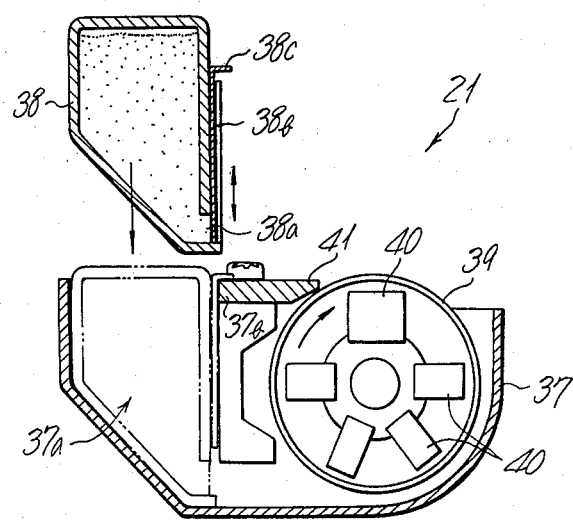
FIG. 3 is a longitudinal section of a developing unit used in the copying machine of FIG. 1.

The developing unit 21 and the cleaning unit 28 will now be described. Referring to FIGS. 2 and 3, the developing unit 21 will be described first. The developing unit 21 employs a one-component developer, which is received in a container 38 which is detachable from a casing 37. A sleeve 39 formed of a non-magnetic material and rotatable in a direction indicated by an arrow is disposed within the casing 37, and a plurality of magnets 40 are fixedly mounted inside the sleeve. A doctor 41 is disposed close to the peripheral surface of the sleeve 39. The container 38 is formed with a developer discharge port 38a which is closed by a cover plate 38b, as indicated in solid line in FIG. 3, before the unit is mounted on the casing. The cover plate 38b is slidable with respect to the container, and is partly formed with a bent portion 38c.

When the container 38 with its port closed by the cover plate 38b is loaded into a container receiving portion 37a of the casing 37, as indicated by phantom line in FIG. 3, the bent portion 38c engages part 37b of the receiving portion 37a to prevent a further movement of the cover plate 38b, whereby the discharge port 38a is opened when the container 38 is fully loaded. The developer which is discharged into the casing 37 through the open port 38a is supplied to the belt 13 by the action of the magnets 40 and the rotating sleeve 39, and is consumed. A replacement of the developer container 38 is achieved by rocking the top portion 1A to its phantom line position shown in FIG. 2. It is to be understood that the top portion 1A can be further rocked beyond the phantom line position shown in FIG. 2. When the container 38 is constructed in the manner mentioned above, it can be loaded into the casing with its port 38a closed, so that a dispersion of the developer can be avoided during its replenishment, thus positively preventing a marring which usually occurs as a result of such dispersion.

The cleaning unit 28 will now be considered. Usually, means are provide for forming a magnetic brush which comprises a sleeve of a non-magnetic material in which a plurality of magnets are disposed so that adjacent poles are of opposite polarity. Either sleeve or the magnets or both may be rotated to hold the developer on the sleeve surface. In either instance, it is desirable that the magnetic field formed on the sleeve surface be uniform around the full periphery and the full length of the sleeve.

In the prior art practice, a single ferromagnetic member is axially magnetized so that adjacent poles have opposite polarities. This resulted in an increased weight of the magnet, and when it is to be rotated, the rotating load disadvantageously increases. In particular, with a rotating magnet arrangement, the necessity to provide a high density of magnetic flux required an increased number of poles, resulting in a magnet arrangement having a poor orientation characteristic.

The cleaning unit 28 avoids such disadvantages. Referring to FIG. 2, the cleaning unit 28 comprises a stationary sleeve 42 of a non-magnetic material, for example, alumnium or non-magnetic stainless steel, a magnet element 43 disposed inside the sleeve and adapted to rotate counterclockwise, a casing 44 and a recovery mechanism 45.

Referring to FIG. 4, the magnet element 43 in the present instance comprises a yoke 46 of a ferromagnetic material having four axially extending fins 46a, and four magnets 47 disposed intermediate these fins. The magnets 47 and the yoke 46 are bonded substantially integrally by means of an adhesive. Alternatively, they may be combined as shown in FIG. 5, and then inserted into a heat shrinkable tube, which is then heated for integral bonding.

The magnets 47 are magnetized, for example, as indicated in FIG. 5, with N-poles located outside and with their S-poles disposed in contact with the yoke 46. As a result, an S-pole is formed in the free end of the fins 46a, forming a magnetic field between it and N-poles of adjacent magnets 47. With this arrangement, magnets of a same specification and polarity can be used, whereby they can be inexpensively manufactured. In addition, advantages are gained in that the magnetic field has a good orientation and the assembly can be reduced in weight. Referring to FIG. 2 again, the recovery mechanism 45 disposed below the sleeve 42 on the right-hand side thereof comprises a rotatable shaft 45a having substantially the same length as the sleeve 42, and a coiled spring 45b which is fixedly mounted around the shaft over its entire length.

As the belt assembly 10 is set in motion, the magnet element 43 rotates clockwise in FIG. 2, and the spring 45b integral with the shaft 45a rotates around the inside of a toner guide 45c which is disposed in abutment against or close to the sleeve surface. At this time, the sleeve 42 is in abutment against or close to the belt 13.

After the transfer of the visual image is completed, as the belt 13 carrying a residue of developer on its surface moves close to the cleaning unit, the residual developer is attracted by the travelling magnetic field formed by the magnet element 43, whereby it is transferred from the belt surface to the sleeve surface. After the transfer onto the sleeve surface, the developer is driven clockwise on the sleeve 12 by the rotating magnet element 43 and is scraped by the spring 45b to be carried into a recovery box, not shown, in the manner of a screw conveyor. In this manner, the residual developer on the belt 13 is completely eliminated by the magnet element 43 having a good orientation.

In the cleaning unit described above, any developer on the surface of the sleeve 42 is scraped off and recovered, by utilizing the toner guide 45c which is disposed in contact or not in contact with the sleeve surface, the shaft 45a and the spring 45b fixedly mounted on the latter and which is driven for rotation. Other forms of recovery mechanism are illustrated in FIGS. 6 to 8.

Referring to FIG. 6, a developer recovery vessel 48 is disposed in the vicinity of the sleeve 42 and has a guide 48a which extends around the peripheral surface of the sleeve in spaced relationship therefrom. The upper end of the guide 48a fixedly carries a scraping blade 49 which has its free end disposed in abutment against the peripheral surface of the sleeve 42. The vessel 48 is detachably mounted on the casing 44 of the cleaning unit or on any other stationary member located in the top portion of the copying machine.

During the cleaning operation, the developer which travels clockwise on the sleeve surface is scraped off the sleeve surface by the scraping blade 49. The developer then moves past the blade 49 and is then driven in a direction indicated by an arrow, along the guide 48a, by the function of the magnet element 43, without falling toward the bottom 48b of the vessel 48. The developer moving along the guide 48a is brought into abutment against a side 48c where their movement is stopped. In other words, the developer scraped off the sleeve surface is sequentially fed into the deepest portion of the vessel 48 without blocking the inlet of the vessel. In this manner, the full capacity of the vessel can be utilized to receive the developer.

In the arrangement shown in FIG. 6, the scraping blade 49 is separate from the recovery vessel 48, but as an alternative arrangement, one end of the guide 48a may be extended into engagement with a detent 42a formed on the sleeve 42, which is formed by a drawing operation, as shown in FIG. 7. In the arrangement of FIG. 6, the magnet element 43 or the sleeve 42 may be rotated in order to remove the developer from the belt 13, but in the arrangement of FIG. 7, the magnet is rotated while the sleeve remains stationary.

From the standpoint of the improved cleaning operation, and the protection of the photosensitive surface of the belt, it is desirable that some developer or a certain degree of magnetic brush be present on the surface of the sleeve 42 which is brought into contact with or located close to the belt.

FIG. 8 shows another form of cleaning unit in which a magnetic brush is formed on the sleeve surface. Specifically, a recovery vessel 48 includes a guide 48a, and a scraping member 50 extends between the guide 48a and the peripheral surface of the sleeve 42. The scraping member 50 is pivotally mounted on the casing 44 by means of a pin 50a. The free end of an adjusting screw 51 bears against one side of the scraping member 50 to urge it against the sleeve surface. As more clearly shown in FIG. 9, this end of the scraping member 50 is formed with a tab 50b to define a clearance G between the scraping member and the sleeve surface.

During the cleaning operation, a portion $D_1$ of the developer D travelling over the sleeve as it is removed from the belt is scraped by the scraping member 50 to be directed into the recovery vessel 48 while the remainder $D_2$ is left on the sleeve surface to form a magnet brush thereon which moves with the sleeve. The remaining developer $D_2$ or the magnetic brush having a tuft which is controlled to the length of the clearance G is fully effective to attract any residual developer from the belt upon contact with the latter.

Figure 9:
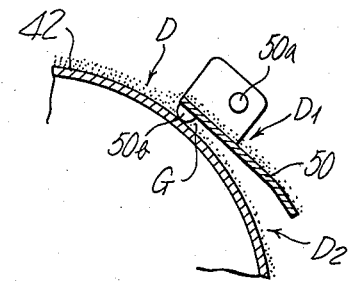
FIG. 9 is an enlarged view of the arrangement shown in FIG. 8, illustrating its operation.

It is to be understood that the amount of any remaining developer on the belt 13 after the completion of the transfer step is minimal, and hence the quantity of the developer which is transferred onto the sleeve 42 of the cleaning unit is also small, even though an increased quantity of the developer D is shown in FIG. 9 for ease of illustration. In the arrangements shown in FIGS. 7 and 8, the developer which is fed into the vessel 48 from the sleeve 42 is driven into the deepest portion of the vessel along the guide 48a.

Figure 10:
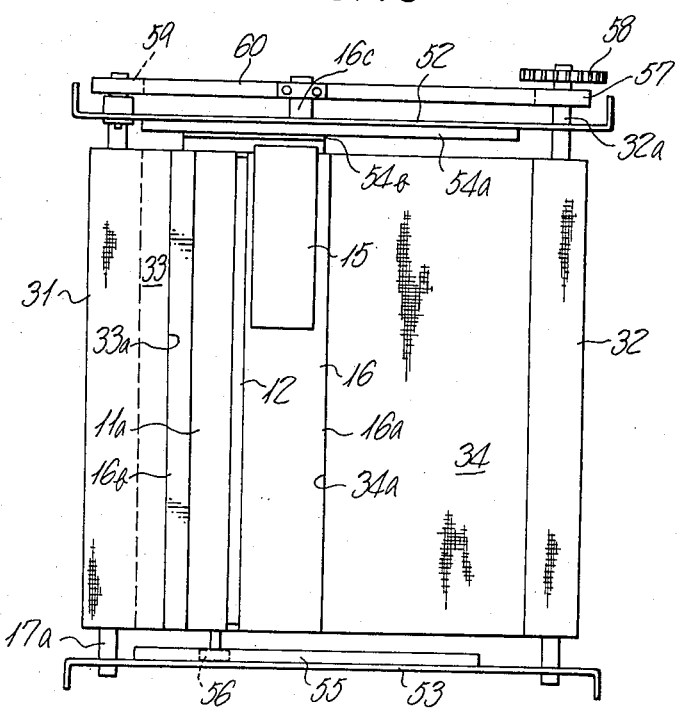
FIG. 10 is a schematic top view of the apparatus according to the invention.

Referring to FIG. 10, the charger and exposure unit 9 will be described more specifically. The support 16 is disposed across a pair of side plates 53, 53. A fixed precision guide rail 54a is fixedly mounted on the side plate 52, and a moving rail 54b fixedly mounted on one side of the support 16 is slidably fitted over the fixed rail. A guide rail 55 which is channel-shaped in cross section is fixedly mounted on the other side plate 53, and a guide roller 56 which is rotatably mounted on the other side of the support 16 is slidably disposed therein. In this manner, the support 16 is movable along the guide rails in the lateral direction, as viewed in FIG. 10.

Figure 11:
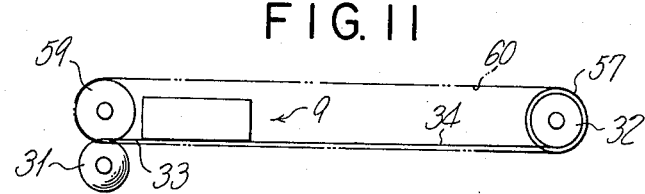
FIG. 11 is a front view of the arrangement of FIG. 10.

The pair of takeup drums 31, 32 are rotatably mounted across the side plates 52, 53. As will be noted from FIGS. 11 and 12, the takeup drum 31 is disposed so that the upper end of its peripheral surface is substantially flush with the lower surface of the support 16 while the takeup drum 32 is disposed so that the lower end of its peripheral surface is substantially flush with the lower surface of the support 16.

The light shield screens 33, 34 disposed on the takeup drums 31, 32 have their one edge 33a, 34a fixedly connected with parts 16a, 16b of the support 16 (see FIG. 2). The takeup drum 32 is mounted on a shaft 32a, on one end of which a belt pulley 57 and a gear 58 are fixedly mounted.

On the other hand, a belt pulley 59 is rotatably mounted on the side plate 52 and a timing belt 60 extends around the pulleys 59, 57. Part 16c of the support 16 is fixedly connected with a portion of the timing belt 60. One of the takeup drums, 31, is urged to take up the screen, by a mechanism, not shown.

The gear 58 is connected with a drive mechanism, not shown, so that when an exposure is initiated in response to the depression of the print button 4a (see FIG. 1), the gear 58 is set in motion to drive the timing belt 60, thus moving the support 16 through its forward stroke. During the forward stroke of the support 16, the takeup drum 32 is driven to take up the light shield screen 34 through an inching spring (not shown). At this time, the light shield screen 33 which is disposed on the drum 31 is unreeled through another inching spring (commonly referred to as "barrel"), not shown. Upon completion of the exposure the gear 58 is driven in the opposite direction to move the support 16 through its reverse stroke, the light shield screen 33 is taken up on the drum 31 while the screen 34 is unreeled from the drum 32.

Figure 13:
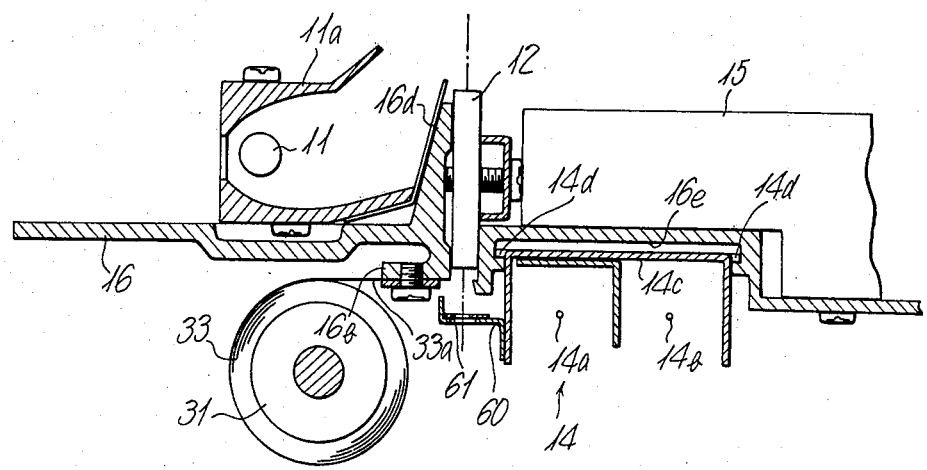
FIG. 13 is an enlarged longitudinal section of the carriage of the apparatus of the invention.

Referring to FIG. 13 to describe the manner of mounting various members on the support 16, the reflector 11a of the illumination lamp 11 is fixedly mounted on the support 16. The imaging optical system 12 is fixedly mounted on an upstanding portion 16d of the support, and the high tension generator 15 is fixedly mounted on the support 16 to the right thereof. The charger 14 is detachably inserted into a guide groove 16e formed in the lower surface of the support 16.

In the present embodiment, the charger 14 comprises a pair of charging electrodes 14a, 14b and a shield case 14c which is disposed in surrounding relationship with these electrodes. A pair of guide pieces 14d (FIG. 14) which are cut from the shield case 14c are slidably fitted into the guide groove 16e so as to be held by the support 16. A support frame 62 having a filter 61 applied thereto is secured to the shield case 14c at a location toward the imaging optical system 12. It is to be understood that the filter 61 is located in alignment with the optical axis of the imaging optical system 12.

Figure 14:
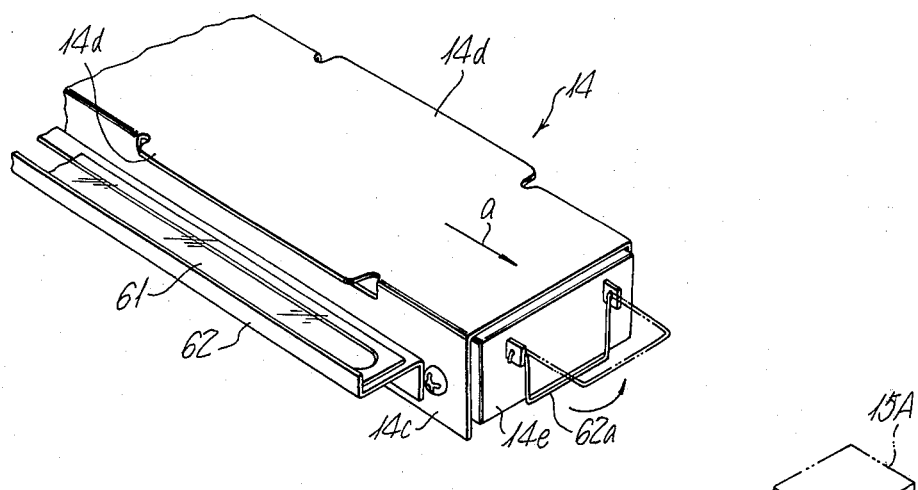
FIG. 14 is a perspective view of part of one form of a charger used in the apparatus of the invention.

The charger 14 inclusive of the filter 61 is slidable with respect to the support 16 (in a direction perpendicular to the plane of the drawing, as viewed in FIG. 13) with a gripper 62a formed on one of end blocks thereof, as shown in FIG. 14, for pulling out the charger.

The gripper 62a is pivotally mounted on an end block 14e, and normally assumes a downwardly depending position by gravity, as indicated in solid line. When it is desired to pull the charger out, the top portion 1a of the copying machine is locked to its upper position shown in FIG. 2, and swinging the gripper 62a to its phantom line position and engaging a finger with it, it may be pulled out of the support 16, in a direction indicated by an arrow a. A plug connected to the electrodes 14a, 14b is fixedly mounted on the other end block, not shown, of the charger 14, and is detachably mounted in a plug jack (not shown) which is fixedly mounted on the support 16. It will be understood that the plug jack is connected to the output terminal of the high tension generator.

It will be understood that as the support 16 moves, the charger 14 moves in a direction perpendicular to that indicated by arrow a (FIG. 14), and it will be noted that the provision of the gripper which can assume different positions when in use and when not in use as indicated in FIG. 14 enables the construction of the charger to be reduced in size and also enables the spacing between the side plates 52, 53 to be reduced. It will be appreciated that the side plate 53 is formed with a window slot (not shown) in alignment with the start position of the charger 14 for allowing the charger to be removed.

The purpose of the filter 61 is to provide a proper spectral sensitivity, and when it is substantially integral with the charger 14 as shown, the need for separate guide rails to remove the filter is avoided, thus simplifying the arrangement.

Figure 15:
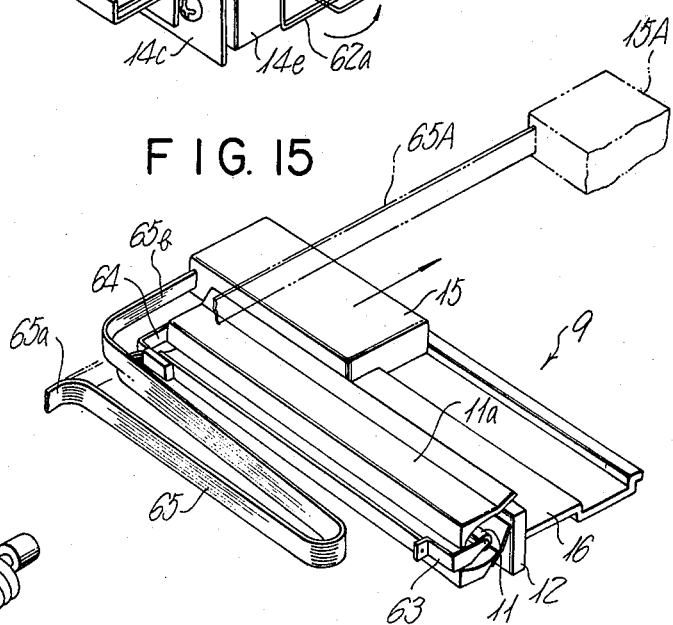
FIG. 15 is a perspective view illustrating the operation of the carriage of the apparatus of the invention.

Referring to FIG. 15, means for energizing the charger and exposure unit 9 will now be described. The illumination lamp 11 is held between a pair of terminals 63, 64, to which a voltage of 100 V is supplied through a flexible, flat cable 65. The flat cable 65 has one end 65a which is connected to a power supply circuit through a stationary portion, not shown, of the top portion 1A of the copying machine. In the embodiment shown in FIG. 15, the cable 65 includes a set of five wires, two of which are connected to the lamp 11 while the remaining three wires 65b are connected to input terminals of the high tension generator 15 through a connector, not shown. These three wires include a first one supplying a low voltage of 24 V, another for ground connection and a third one used for remote control purpose.

In the start position of the charger and exposure unit 9 shown in solid line in FIG. 15, the cable is flexed, but it becomes stretched as indicated at 65A, when the high tension generator 15 has moved to its end position indicated at 15A. During the reverse stroke of the unit 9, the cable 65 becomes flexed again as shown in solid line.

When the high tension generator 15 supplies a high tension to the charger 14 is constructed in substantially integral manner with the latter in accordance with the invention to permit a charging operation and an exposure while it moves with respect to the photosensitive member which remains at rest, a high tension cable wiring between the charger and the high tension generator is dispensed with, reducing the risk of a leak or electric shock and also suppressing the occurrence of radio interferences.

Figure 12:
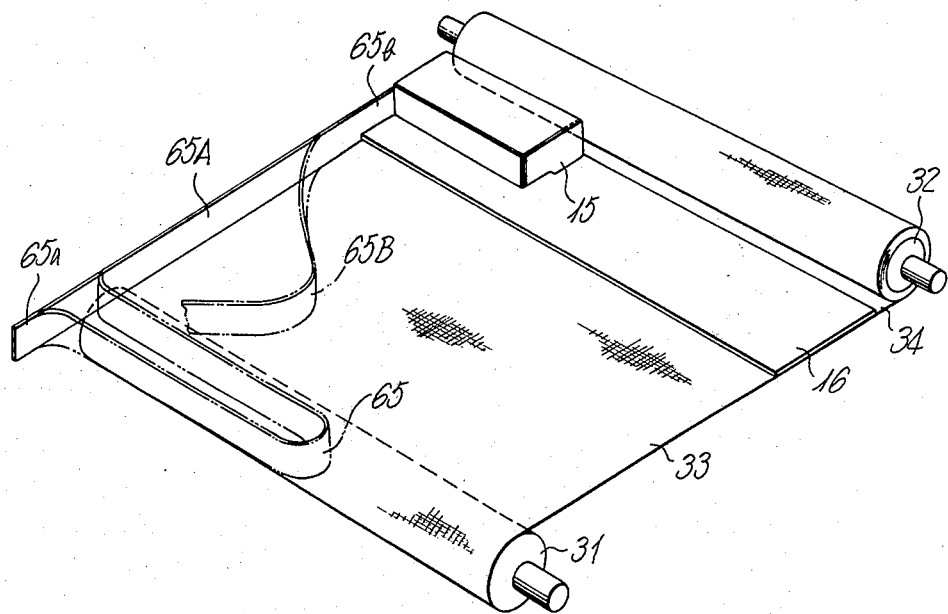
FIG. 12 is a perspective view illustrating one form of the power supply means.

As mentioned previously, the light shield 33 is fixedly mounted on the support 16, but the cable 65 may be located on the screen 33 as indicated in FIG. 12 to allow it to shrink or stretch thereon, thus dispensing with the need to provide a guide element for the cable.

When the light shield screen is utilized as a guide element for the cable, the arrangement of the takeup drum associated with the screen in the manner illustrated in FIGS. 2 and 12 is very effective. Specifically, the takeup drum 31 associated with the screen 33 which guides the cable is disposed on the opposite side of the screen 33 from the cable 65. As a result of such arrangement, the cable 65 is located outside the screen which is being taken up on the drum 31, whereby the likelihood is eliminated that the cable may be wrapped into the drum as it shrinks and stretches during a movement of the charger and exposure unit 9.

In FIG. 12, a character 65A indicates the stretched condition of the cable while a character 65B indicates the cable as it is being stretched or shrinking. The support 16 is only diagrammatically indicated.

Figure 16:
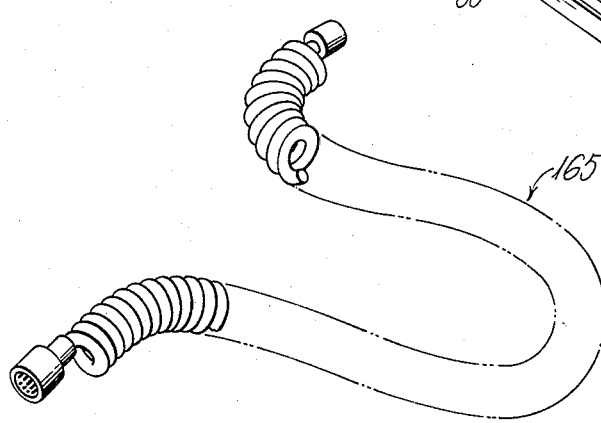
FIG. 16 is a perspective view of another form of power supply means.

In the embodiment described above, the flat cable 65 is used to energize the moving unit. However, a flexible cable 165 in the form of a helical coil as shown in FIG. 16 may be used. Again, the light shield screen can be utilized as a guide element for the cable.

As mentioned previously, it is a feature of the invention that the charger and the high tension generator are mounted on the support which acts as a carrier, thus dispensing with a high tension wiring.

The charger and exposure unit 9 includes the illumination lamp 11 which is used to illuminate an original. Accordingly, the lamp may rise to a relatively high temperature. To cope with this problem, the cooling fan 35 is provided as indicated in FIG. 2 to discharge the internal air of the copying machine through the duct 13 and cooler air is introduced into the machine through an admission port 8, as indicated in FIGS. 1 and 2. In other words, as viewed in FIG. 2, there is an air stream flowing from right to left through the copying machine. In such arrangement, the charger and exposure unit 9 is located upstream while the illumination lamp 11 which represents a heat source is located downstream, thus preventing adverse influence of the heat from the lamp upon the high tension generator 15 and the imaging optical system 12.

As compared with a copying machine which employs a photosensitive member in the form of a drum, the electrophotographic copying machine of the invention which employs a photosensitive member in the form of an endless belt has an advantage that the overall size can be reduced. A high degree of planarity which is very close to an optical plane is required of an exposed portion of the endless belt. Also, a displacement of the belt in the lateral direction or crosswise must be prevented. Whether the endless belt is held stationary while the optical system moves to effect an exposure, or the optical system is held stationary while the original and the endless belt experience a movement for purpose of exposure, a lateral displacement of the endless belt must be positively prevented.

It is a relatively simple matter to achieve the required planarity of the endless belt in its exposed region by the use of roller elements having a high degree of uniformity for carrying the belt thereon and across which a given tension is maintained in the belt, in combination with the provision of a flat guide on the inside of the endless belt. However, it is difficult to prevent a lateral displacement or lateral offset of the endless belt in a positive manner. A variety of arrangements have heretofore been proposed. In one arrangement, a self-aligning mechanism is incorporated in which the opposite ends of the roller elements are provided with flanges which prevent a lateral displacement of the endless belt. While this positively prevents a lateral offset of the belt, a disadvantage that a complex construction results is unavoidable. In another arrangement, a plurality of perforations are formed at a given pitch along one edge of the endless belt and are engaged by a sprocket to drive the belt. However, a difficulty is experienced in working the endless belt, and there also occurs a problem in respect of the mechanical strength of the belt. No satisfactory durability can be achieved. Since a high level of positional accuracy must be maintained between the perforations in the endless belt and the sprocket, a poor interchangeability of the belt and the sprocket results. In a further arrangement, a plurality of rollers are spaced apart along the width of the endless belt to accommodate for a lateral displacement of the endless belt by waviness. However, in most cases, the resulting arrangement becomes complex and requires an increased size while suffering from a difficulty in achieving a high level of planarity in the exposed region. In a still further arrangement, the rear side of the endless belt is formed with lengthwise extending guide members, which engage rollers to prevent the lateral displacement of the endless belt. In this instance, a difficulty is experienced in the bonding between the endless belt and the guide members, and a problem arises in the stability over a prolonged period of use.

In a more general endless belt assembly, a crowned roller is used in order to prevent a lateral displacement of the endless belt. However, this is ineffective for an endless belt having an increased width and exhibiting little elongation. As a result, it is difficult to prevent a lateral displacement of the endless belt in a positive manner. The application of external force to the endless belt through the guide members in order to urge the belt against a reference surface located on one side of susceptible to damage to the belt, and cannot be used with an endless belt which forms a photosensitive member.

The electrophotographic copying machine of the invention includes an endless belt assembly of a novel structure which is simple and compact in construction and capable of positively preventing a lateral displacement of the belt without applying undue external forces. The assembly includes three or more roller elements, and an endless belt extending around these roller elements. At least one of roller elements defines an antiskew roller having one end on which a flange is provided to restrict a movement of the endless belt in the axial direction of the roller. At least two of the roller elements rotate about axes which are substantially parallel to each other. A spring assembly urges the antiskew roller in a direction to maintain a tension in the endless belt, and is constructed to exert a resilience of a greater magnitude to the end of the roller which is opposite from the end on which the flange is provided.

Referring to FIGS. 18 to 20, in the embodiment shown, the belt assembly includes a drive roller 17, a stationary roller 18 and a tension roller 19 around which the belt 13 extends. As indicated at 13a, the opposite ends of the belt are bonded together by a ultrasonic welding, outside the first and second image forming regions, thereby forming an endless loop. A frame 66 is disposed inside the loop of the belt 13, and has an upper face in the form of a guide plate 20 which bears against the inner surface of the belt in its upper run. A pair of side plates 67, 68 are secured to the opposite sides of the frame 66. Roller support means are mounted on these side plates, but since the construction is similar for both parts, the roller support means on the side plate 67 will be specifically described.

The drive roller 17 is rotatably supported by a support member 69 having a pair of elongate slots 69a, 69b in which a pair of pins 70, 71 are loosely fitted. These pins 70, 71 are used to secure the side plate 67 to the frame 66. In this manner, the support member 69 is slidably mounted on the side plate. A spring 72 extends between the pin 71 and a detent piece 69c which is cut from the support member 69, thus urging the member 69 to move to the right as viewed in FIG. 20. The support member 69 is formed with a fold 69d at its one end and is also formed with a support hole 69e in its other end.

A bearing member 73 is fitted into the support hole 69e for supporting one end of the shaft 17a of the drive roller 17, thus rotatably carrying it. The other end of the shaft is similarly supported by another bearing member, and fixedly carries a gear (not shown) which is connected to a drive source not shown.

An eccentric cam 74 is fixedly mounted on a shaft 75 which is in turn rotatably mounted across the side plates 67, 68, and is disposed in abutment against the fold 69d. A lever 76 is integrally secured to the cam 74. Normally, the lever is turned so that a portion of the eccentric cam 74 having an increased diameter is brought into abutment against the fold 69d, as shown in FIG. 18, thus urging the support member 69 to the left against the resilience of the spring 72. When the lever 76 is turned through 180° from the position shown in FIG. 18, the support member 69 is allowed to move to the right under the resilience of the spring 72, whereby the spacing between the axes of the drive roller 17 and the stationary roller 18 is reduced, permitting a replacement of the belt 13.

The stationary roller 18 is rotatably mounted across the side plates 67, 68 by utilizing a shaft and bearings, neither of them shown. A tension lever 78 is pivotally mounted on a stepped screw 77 which is used to secure the stationary roller to its shaft. The tension lever 78 includes one end 78a which rotatably carries one end of the tension roller 19. As shown in FIG. 20, a flange 19a is formed on the other end of the tension roller 19. The other end 78b of the tension lever 78 is engaged by one end of a tension spring 80, the other end of which is anchored to a pin 79 which is fixedly mounted on the side plate 67. The other end of the tension roller 19 (which carries the flange) is similarly supported by another tension lever 81, which is engaged by a tension spring 82. In this manner, these levers and the springs maintain a tension in the belt 13. It is to be noted that the opposite ends of the tension roller 19 are independently supported so as to be rotatable. As will be described later, a tension of different magnitudes is applied to the opposite ends of the tension roller, but when these ends are supported independently, it is possible to assure a smooth rotation of the tension roller. However, it should be understood that the opposite ends of the tension roller may be supported by a common shaft depending on the magnitude of the displacement thereof.

The tension springs 82, 80 are adapted to exert tensions $F_1$ and $F_2$ which are related such that $F_1 < F_2$. Thus, the tension applied by the tension spring 80 is greater than that applied by the tension spring 82 which is located on the side on which the flange is provided. Experiments have shown that suitable values are $F_1 = 300$ g and $F_2 = 800$ g.

Figure 21:
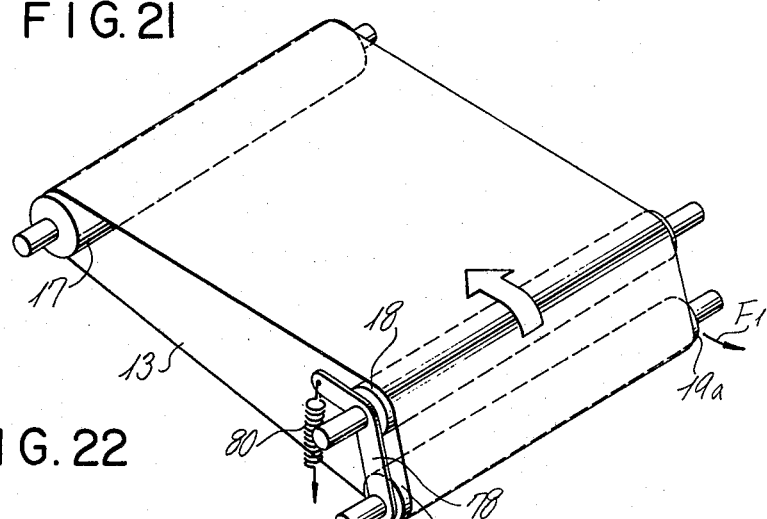
FIG. 21 is a perspective view illustrating a simplified arrangement belt-shaped photosensitive member of the embodiment of the sent invention.

When the tension springs are set in the manner mentioned above, the belt 13 which extends around the rollers will turn around the end to which a tension of a lesser magnitude is applied, namely, the end on which the flange 19a is provided. Consequently, it will be understood that the belt 13 will be offset in the axial direction of the roller and travels along a given locus as it passes between the rollers. FIG. 21 shows the belt assembly in a simplified form in order to describe the principle of operation of the belt assembly more specifically. As mentioned previously, tensions related such that $F_1 < F_2$ are applied to the opposite ends of the tension roller 19. In other words, the endless belt assembly is constructed such that the described unbalanced tensions causes an offset of the belt toward the flange 19a.

In order to describe the effect of the invention, the imbalance in the tensions applied by the respective tension springs will be neglected for the moment. Roller pairs which may cause an offset of the belt are the roller pair formed by the drive roller 17 and the tension roller 19 and another pair formed by the tension roller 19 and the stationary roller 18. For the convenience of description, the latter roller pair will be considered.

Figure 22:
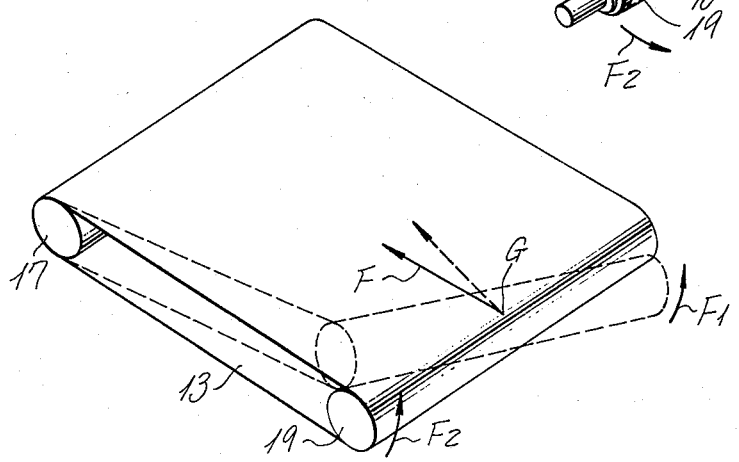
FIGS. 22 to 26 are views illustrating a principle of operation of the present invention.

Referring to FIG. 22, it is assumed that both the stationary roller 18 and the tension roller 19 are located on a common plane with their axes disposed in parallel relationship ideally. Also it is assumed that the belt 13 has an equal peripheral length along its opposite edges. Under such conditions, when tensions of an equal magnitude are applied, the belt 13 will run in a stable manner without offsetting to either side across these rollers.

However, when tensions related such that $F_1 < F_2$ are applied to the tension roller 19, the roller will turn around the center of gravity G, whereby the belt 13 will be skewed at an angle with respect to the stationary roller 18, as indicated in broken lines. When the belt 13 is caused to run under the condition shown by broken lines in FIG. 22, there occurs an offset of the belt to the right or toward the side indicated by $F_1$.

Figure 23:
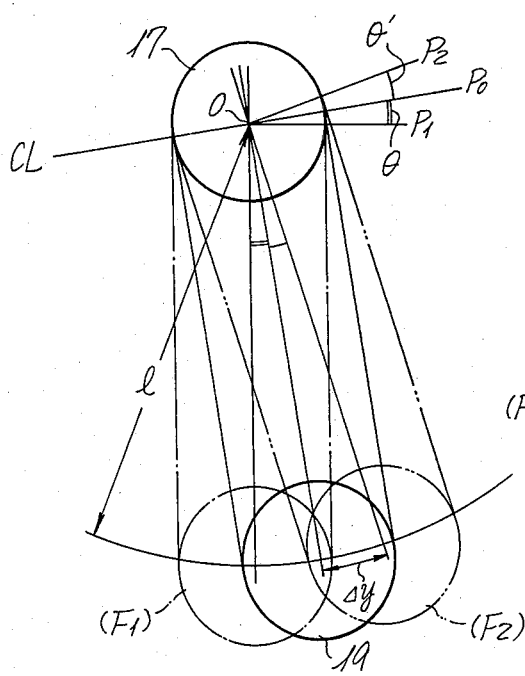
Figure 24:
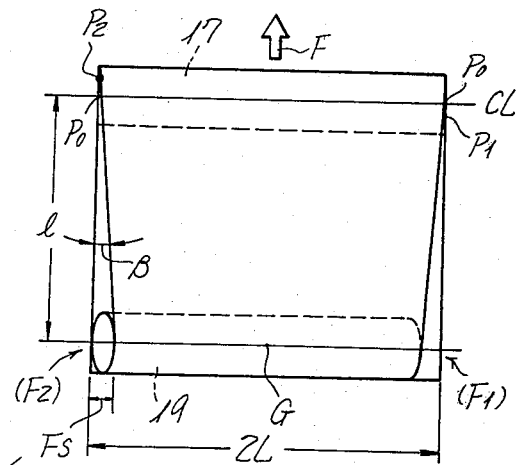
Figure 25:
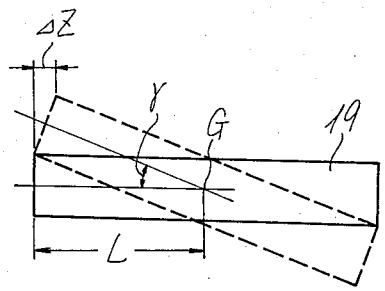

Such an offset of the belt is believed attributable to the occurrence of an admission point P and an angle of admission $\theta$ as indicated in FIGS. 23 and 24. Representing the point of contact between an ideal line CL of the stationary roller 18 and the belt 13 by $P_0$, the point of contact will shift to point $P_1$ on the $F_1$-side or on the side on which the flange 19a (FIG. 21) is provided while it shifts to point $P_2$ on the $F_2$-side or on the opposite side if the unbalanced tensions are applied. Then we have $\angle P_1OP_0 = \angle P_2OP_0$, whereby $\theta = \theta'$. Representing the offset of the belt by Fs, it can be derived as a function of the angle of admission $\theta$ as indicated below. Representing the spacing between the axes of related rollers by l, the travel $\Delta y$ of the roller on the $F_2$-side will be $\Delta y = l \sin \theta$ while the travel $\Delta z$ of the roller in the axial direction (FIG. 22) will be $\Delta z = L (1 - \cos \gamma) + R_2 \sin \gamma$ where $R_2$ refers to the tension roller 19.

$$Fs\alpha \tan\beta = \frac{L(1 - \cos\gamma) + R_2 \sin\gamma}{l}$$

Figure 26:
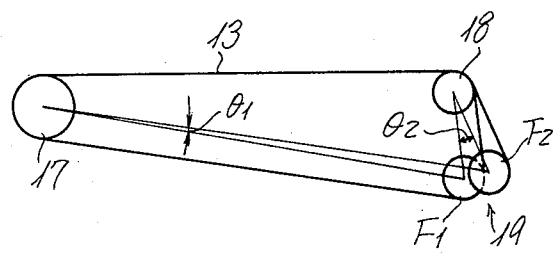

The above description refers to the offset between the stationary roller 18 and the tension roller 19, but the same applied to the offset between the drive roller 17 and the tension roller 19. Introducing specific values into the arrangement of the invention, the offset will be calculated, regarding it as an angle of admission. Referring to FIG. 26, the spacing between the axes of the drive roller 17 and the tension roller 19 is chosen to be 280 mm, the axial length of the tension roller 19 is chosen to be 380 mm, and the spacing between the axes of the stationary roller 18 and the tension roller 19 is chosen to be 30 mm. The tension roller 19 is then displaced by 2 mm ($\Delta y$ shown in FIG. 23). In this instance, the displacement of the tension roller 19 relative to the drive roller 17 will be 0.11 mm. consequently, we have as angles of admission $$\tan \theta_1 = \frac{0.11}{280} = 0.00039 \quad \theta_1 = 0°\ 01'$$

$$\tan \theta_2 = \frac{2}{30} = 0.06666 \quad \theta_2 = 3°\ 49'$$

$$Fs_1 = \frac{L(1 - \cos\gamma_1) + R_2 \sin\gamma}{l} \quad (\gamma_1 = 0.025°)$$

$$= 1.6 \times 10^{-5}$$

-continued
$$Fs_2 = \frac{L(1 - \cos\gamma_2) + R_2 \sin\gamma}{l} \quad (\gamma_2 = 0.63°)$$

$$= 4 \times 10^{-3}$$

$Fs_1$ represents the offset between the drive roller 17 and tension roller 19 while $Fs_2$ represents the offset between the stationary roller 18 and the tension roller 19. Thus, $Fs_1 < Fs_2$.

It will be understood from the foregoing that the offset of the belt is greatly influenced by the angle of admission between the stationary roller 18 and the tension roller 19. It then follows that the offset with respect to the stationary roller 18 can be controlled by controlling the magnitude $\tan \theta_2$ with respect to the tension roller 19 while the variable $\tan \theta_1$ can be neglected.

It is a fundamental idea of the invention to cause a displacement of the tension roller relative to the stationary roller so that an offset occurs in the belt, which is then constrained by the flange to permit its running along a reference locus.

While the numerical values given above relate to the ideal conditions of the rollers and the belt, it is found that in the arrangement employing three rollers as indicated in FIG. 20, an adjustment of the tensions $F_1$, $F_2$ applied to the tension roller 19 in a range from 300 to 1,000 g always results in an offset of the belt to one side to assure a stable belt running if a belt having differential peripheral lengths along its opposite edges is used or the location of the rollers are displaced experimentally. It is to be noted that the difference in the peripheral lengths or the displacement of the roller locations exceed normal tolerances usually experienced.

The belt assembly 10 shown in FIGS. 18 to 20 is detachably mounted on the top portion 1A (FIG. 2) of the copying machine 1. The frame (not shown) of the top portion 1A fixedly carries a bracket 83 in which the bearing 73 associated with the drive roller 17 is fitted. The side plates 67, 68 are formed with openings 84, 85 through which locking screws 86 (only one being shown) extend to fixedly connect the assembly with the frame.

The belt assembly 10 can be dismounted from the copying machine by unscrewing the locking screws 86 and withdrawing the bearing 73 from the bracket 83 when the top portion 1A is rocked to its phantom line position shown in FIG. 2. The assembly 10 can be mounted in place by an opposite procedure.

As mentioned previously, the tension roller 19 is provided with the flange 19a in order to constrain the belt which shifts toward it. FIGS. 27 and 28 illustrate the manner of mounting it. In FIG. 27, the flange 19a is secured to the tension roller 19 in substantially integral manner. The tension roller 19 is mounted on a support shaft 88 with a bearing 87 interposed therebetween. The shaft 88 is fixedly connected with the tension lever 78. In this instance, the flange 19a rotates integrally with the tension roller 19. In FIG. 28, the flange 19a is mounted on a support shaft 88 with a bearing 89 interposed therebetween in order to permit an independent rotation of the flange 19a from the tension roller 19.

In the embodiment shown in FIG. 18, the belt 13 extends around three roller elements including the drive roller 17, the stationary roller 18 and the tension roller 19. The stationary roller need not be rotatable. For example, part of the frame 66 may be shaped into a roller element 66b having a configuration of part of a cylinder surface which guides the belt 13, as illustrated in FIGS. 29 and 30.

Figure 29:
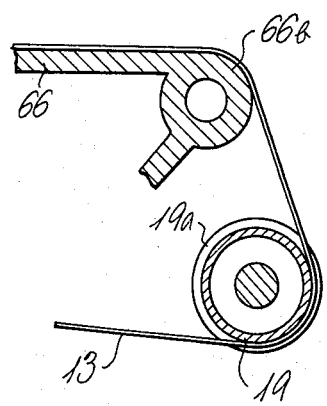
FIGS. 29 and 30 are a front view and a cross section of part of different arrangements of the invention.
Figure 30:
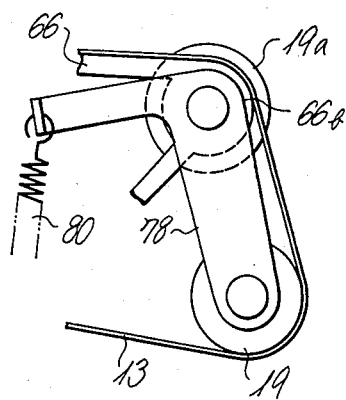

The flange which constrains the offset of the belt may be provided on the side of the tension roller 19 as shown in FIG. 29, or may be provided on the side of the stationary roller element 66b as shown in FIG. 30. The flange 19a shown in FIG. 30 is preferably made rotatable so as to be more effective upon the offset of the belt.

The embodiment shown in FIG. 20, the side plates 67, 68 which represent support means for roller elements other than the tension roller are separate from the frame 66 which functions as belt guide means. When such an arrangement is employed, the frame 66 can be moved independently from the location of the roller elements, so that it is possible to adjust the relative location with respect to the exposure optical system 12 or a focusing adjustment. In FIG. 18, as the pin 70 is turned, the left-hand end of the frame 66 moves vertically. The vertical location of the righthand end of the frame 66 is adjusted by the length of projection of adjusting screws 90, 91 (FIG. 20) which are threadably engaged with the side plates 67, 68, and then it is secured to the top portion 1A by locking screws 86.

Where there is no need for a focusing adjustment, a frame 92, which represents the described frame 66 integral with the side plates 67, 68, may be used to support the roller elements and to maintain the planarity of the belt. This arrangement permits a reduction in the weight of the apparatus, facilitating an opening and a closing of the top portion of the copying machine. In addition, the frictional braking mechanism which holds the top portion 1A at a selected angle can be constructed in a relatively simple manner.

Figure 31:
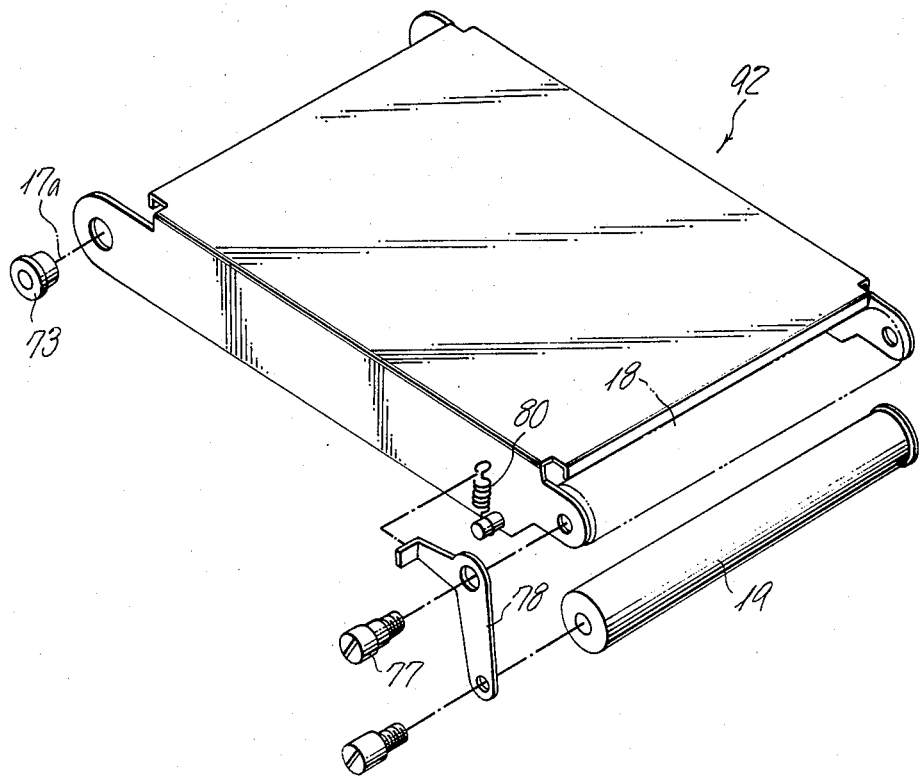
FIG. 31 is a perspective view of a further embodiment of the invention.

In the embodiment shown in FIG. 31, a replacement of the belt takes place by rocking the tension lever 78 to remove tension from the belt after the entire assembly is removed from the copying machine.

Referring to FIGS. 32, 33, there is shown an arrangement which facilitates a replacement of the belt. The belt assembly 10 is fixedly mounted on the top portion of the copying machine by fitting the bearing 73 in the bracket 83 and arranging one end of the support shaft for the stationary roller 18 to be urged by a holder 93, which is rockably mounted on the frame of the top portion 1A, not shown. An eccentric cam 94 abuts against one end of the holder 93. When the cam 94 assumes its position shown in solid line, it urges the holder to maintain the assembly 10 in place. When it is desired to dismount the assembly 10, the eccentric cam 94 is turned to its phantom line position.

A hook 95 is pivotally mounted on the side of the frame 92 and when it is desired to interchange the belt 13, the tension lever 78 is locked against the resilience of the spring 80 to be retained by the hook 95. In this manner, tension is removed from the belt, and the belt 13 in its free condition can be removed, and replaced by a fresh belt. Subsequently, the hook is disengaged to maintain the tension in a new belt.

What is claimed is:

1. In an electrophotographic copying machine including a photosensitive member in the form of an endless belt having a portion which remains flat when the belt is at rest, a carriage disposed for reciprocating motion in parallel relationship with the flat portion of the photosensitive member, support means for supporting the carriage in a reciprocable manner, drive means for causing a reciprocating motion of the carriage, a charger mounted on the carriage for charging the photosensitive member by a corona discharge, an illumination unit mounted on the carriage for illuminating an original located in place, and a light transmitting device for transmitting an image of the illuminated original onto the photosensitive member; the improvement including a high tension generator mounted on the carriage for supplying a high tension to the charger and conductor means for supplying a relatively low voltage to said high tension generator.

2. An electrophotographic copying machine according to claim 1 in which the high tension generator is located upstream of the illumination unit as viewed in the direction of flow of a cooling air stream which cools the illumination unit.

3. An electrophotographic copying machine according to claim 1 in which a pair of shield screens are disposed forwardly and rearwardly of the carriage as viewed in the direction of movement thereof to prevent extraneous light which does not pass through the light transmitting device from reaching the photosensitive member, the upper surface of the shield screens carrying thereon an electrical conductor to the illumination unit and an electrical conductor forming said conductor means so as to enable said conductors to be freely flexible on said shield screens.

4. An electrophotographic copying machine according to claim 1 in which the charger is detachably mounted on the carriage.

5. An electrophotographic copying machine according to claim 1 in which the light transmitting device comprises an array of focusing light transmitting medium.

6. An electrophotographic copying machine according to claim 1 in which the belt extends around at least three roller elements, at least one of which represents an anti-skew roller element, a flange being provided on one end of the anti-skew roller element or other roller elements for constraining a movement of the belt in the axial direction of the roller element, the anti-skew roller element being urged by a spring assembly in a direction to maintain a tension in the belt, the spring assembly applying a resilience of a greater magnitude to the axial end of the roller element which is opposite from the end on which the flange is provided.

7. An electrophotographic copying machine according to claim 2 in which the direction of flow of the cooling air stream which cools the illumination unit is parallel to the direction of movement of the carriage.

8. An electrophotographic copying machine according to claim 3 in which the respective shield screens have their one edge secured to the carriage and their other edge connected with respective take-up drums which are urged to take up the respective screens, the take-up drum being located on the opposite side of the screen from the conductors.

9. An electrophotographic copying machine according to claim 3 in which the conductors constitute together a flexible, ribbon-shaped flat cable.

10. An electrophotographic copying machine according to claim 3 in which the conductors constitute together a flexible helically wound cable having a freely variable length.

11. An electrophotographic copying machine according to claim 4 in which the charger is associated with a correction filter in substantially integral manner therewith which is disposed on a light path between the light emitting surface of the light transmitting device and the photosensitive member.

12. An electrophotographic copying machine according to claim 6 in which the roller elements include a drive roller connected to a drive source, a stationary roller disposed for rotation about an axis parallel to the axis of the drive roller, and a tension roller rotatably supported to maintain a tension in the belt which extends around these rollers, the flange being formed on one end of the tension roller, the opposite ends of the tension roller being engaged by the spring assembly.

13. An electrophotographic copying machine according to claim 6 in which the belt is detachably mounted on the machine.

14. An electrophotographic copying machine according to claim 6 in which the three or more roller elements comprise a drive roller for driving the belt for angular movement, a rotatable tension roller for maintaining a tension in the belt, and a non-rotatable belt guide element having a surface corresponding to part of a cylinder.

15. An electrophotographic copying machine according to claim 6 in which the flange is rotatable relative to the roller element.

16. An electrophotographic copying machine according to claim 6 in which the flange is substantially integral with the roller element.

17. An electrophotographic copying machine according to claim 6 in which at least one of the three or more roller elements is disposed to be movable to reduce the spacing between its axis and the axis of another one or more of the roller elements in order to permit the belt to be interchanged.

18. An electrophotographic copying machine including a photosensitive member in the form of an endless belt having a portion which remains flat when the belt is at rest, a carriage disposed for reciprocating motion in parallel relationship with the flat portion of the photosensitive member, support means for supporting the carriage in a reciprocable manner, drive means for causing a reciprocating motion of the carriage, a charger mounted on the carriage for charging the photosensitive member by a corona discharge, a high tension generator mounted on the carriage for supplying a high tension to the charger, an illumination unit mounted on the carriage for illuminating an original located in place, a light transmitting device for transmitting an image of the illuminated original onto the photosensitive member, a pair of shield screens disposed forwardly and rearwardly of the carriage as viewed in the direction of movement thereof to prevent extraneous light which does not pass through the light transmitting device from reaching the photosensitive member, the upper surface of the shield screens carrying electrical conductors in the form of flexible cables extending to the illumination unit and to the high tension generator so as to be freely flexible thereon, the respective shield screens having their one edge secured to the carriage and their other edge connected with respective take-up drums urged to take up the respective screens, the take-up drum being located on the opposite side of the screen from the conductors.

19. An electrophotographic copying machine according to claim 18, said cables being in the flat and ribbon-shaped.

20. An electrophotographic copying machine according to claim 1, said low voltage being on the order of 24 v.

* * * * *